United States Patent
Ghose et al.

(10) Patent No.: US 9,596,159 B2
(45) Date of Patent: Mar. 14, 2017

(54) FINDING LATENCY THROUGH A PHYSICAL NETWORK IN A VIRTUALIZED NETWORK

(71) Applicant: Juniper Networks, Inc., Sunnyvale, CA (US)

(72) Inventors: Tirthankar Ghose, San Ramon, CA (US); Harshad Bhaskar Nakil, San Jose, CA (US); ND Ramesh, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 65 days.

(21) Appl. No.: 14/788,398

(22) Filed: Jun. 30, 2015

(65) Prior Publication Data

US 2015/0304194 A1    Oct. 22, 2015

Related U.S. Application Data

(63) Continuation of application No. 13/840,657, filed on Mar. 15, 2013, now Pat. No. 9,094,308.

(Continued)

(51) Int. Cl.
*H04L 12/26* (2006.01)
*H04L 12/931* (2013.01)
(Continued)

(52) U.S. Cl.
CPC .......... *H04L 43/0852* (2013.01); *H04L 41/12* (2013.01); *H04L 43/028* (2013.01);
(Continued)

(58) Field of Classification Search
None
See application file for complete search history.

(56) References Cited

U.S. PATENT DOCUMENTS 6,760,328 B1    7/2004  Ofek
7,042,838 B1    5/2006  Shand et al.
(Continued)

FOREIGN PATENT DOCUMENTS

CN    101582845 A    11/2009
CN    101917331 A    12/2010
(Continued)

OTHER PUBLICATIONS

Extended Search Report from counterpart European Application No. 15187251.2, dated Feb. 3, 2016, 5 pp.
(Continued)

*Primary Examiner* — Gary Mui
(74) *Attorney, Agent, or Firm* — Shumaker & Sieffert, P.A.

(57) ABSTRACT

Techniques are described for determining latency in a physical network that includes a number of network devices over which packets travel. A virtual network controller receives a plurality of messages from a plurality of network devices in a network, each of the messages including a packet signature comprising a hash of an invariant portion of an original packet that uniquely identifies the original packet, an identifier of one of the plurality of network devices from which the respective message was received, and a timestamp indicating a time an original packet was processed by the network device from which the respective message was received. The virtual network controller determines a latency of a physical network path in the network based on analysis of contents of the identified messages having a common packet signature.

13 Claims, 8 Drawing Sheets

Related U.S. Application Data

(60) Provisional application No. 61/722,696, filed on Nov. 5, 2012, provisional application No. 61/721,979, filed on Nov. 2, 2012, provisional application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
*H04L 12/24* (2006.01)
*H04L 12/713* (2013.01)
*H04L 12/937* (2013.01)
*H04L 29/06* (2006.01)

(52) U.S. Cl.
CPC .......... *H04L 43/106* (2013.01); *H04L 45/586* (2013.01); *H04L 49/254* (2013.01); *H04L 49/356* (2013.01); *H04L 49/70* (2013.01); *H04L 69/22* (2013.01)

(56) References Cited

U.S. PATENT DOCUMENTS

| | | | |
|---|---|---|---|
| 7,184,437 | B1 | 2/2007 | Cole et al. |
| 7,519,006 | B1 | 4/2009 | Wing |
| 7,606,887 | B1 | 10/2009 | Stewart et al. |
| 7,937,492 | B1 | 5/2011 | Kompella et al. |
| 8,339,959 | B1 | 12/2012 | Moisand et al. |
| 9,094,308 | B2 | 7/2015 | Ghose et al. |
| 2007/0195797 | A1 | 8/2007 | Patel et al. |
| 2007/0223388 | A1 | 9/2007 | Arad et al. |
| 2008/0044181 | A1 | 2/2008 | Sindhu |
| 2008/0267073 | A1 | 10/2008 | Thaler |
| 2009/0037713 | A1 | 2/2009 | Khalid et al. |
| 2009/0304007 | A1 | 12/2009 | Tanaka et al. |
| 2010/0061242 | A1 | 3/2010 | Sindhu et al. |
| 2011/0006818 | A1 | 1/2011 | Takagi et al. |
| 2011/0063988 | A1 | 3/2011 | Lee et al. |
| 2011/0206055 | A1* | 8/2011 | Leong .................. H04L 49/00 370/401 |
| 2011/0267952 | A1 | 11/2011 | Ko et al. |
| 2011/0307889 | A1 | 12/2011 | Moriki et al. |
| 2012/0011170 | A1 | 1/2012 | Elad et al. |
| 2012/0207161 | A1 | 8/2012 | Uppalli et al. |
| 2012/0230186 | A1 | 9/2012 | Lee et al. |
| 2012/0257631 | A1* | 10/2012 | Nguyen ................ H04L 43/16 370/400 |
| 2013/0100816 | A1 | 4/2013 | Bergamasco et al. |
| 2013/0294243 | A1 | 11/2013 | Wiley et al. |
| 2013/0297774 | A1 | 11/2013 | Pope et al. |

FOREIGN PATENT DOCUMENTS

| | | |
|---|---|---|
| EP | 1890438 A1 | 2/2008 |
| WO | 2013184846 A1 | 12/2013 |

OTHER PUBLICATIONS

First Office Action and Search Report, and translation thereof, from counterpart Chinese Application No. 201510587514.6, dated Jun. 13, 2016, 9 pp.

Response to Communication pursuant to Rule 69 EPC dated Mar. 14, 2016, from counterpart European Application No. 15187251.2, filed Sep. 6, 2016, 2 pp.

Bocci et al., "MPLS Generic Associated Channel," RFC 5586, The IETF Trust, Jun. 2009, 19 pp.

Bradner et al., "Benchmarking Methodology for Network Interconnect Devices," RFC 2544, The Internet Society, Mar. 1999, 31 pp.

Conta et al., "Internet Control Message Protocol (ICMPv6) for the Internet Protocol Version 6 (IPv6) Specification," RFC 4443, The Internet Society, Mar. 2006, 24 pp.

Hopps et al., "Analysis of an Equal-Cost Multi-Path Algorithm," RFC 2992, Nov. 2000, 8 pp.

Invitation to Pay Additional Fees from International Application No. PCT/US2013/044378, dated Sep. 18, 2013, 5 pp.

ITU-T Y.1564, Series Y: Global Information Infrastructure, Internet Protocol Aspects and Next-Generation Networks, Internet protocol aspects—Quality of service and network performance, Ethernet service activation test methodology, The International Telecommunication Union, Mar. 2011, 38 pp.

ITU-T Y.1731, Series Y: Global Information Infrastructure, Internet Protocol Aspects and Next-Generation Networks, Internet protocol aspects—Operation administration and maintenance, OAM functions and mechanisms for Ethernet based networks, The International Telecommunication Union, May 2006, 80 pp.

Katz et al., "Bidirectional Forwarding Detection (BFD)," RFC 5880, The IETF Trust, Jun. 2010, 49 pp.

Kompella et al., "Detecting Multi-Protocol Label Switched (MPLS) Date Plane Failures," RFC 4379, The Internet Society, Feb. 2006, 50 pp.

Nadeau et al., "Pseudowire Virtual Circuit Connectivity Verification (VCCV): A Control Channel for Pseudowires" RFC 5085, The IETF Trust, Dec. 2007, 30 pp.

Niu et al., "Service Chaining Header and Service Chaining Mechanism," Internet Draft, The IETF Trust, Jul. 15, 2013, 9 pp.

Notification of Transmittal of the International Search Report from International Application No. PCT/US2013/044378, dated Nov. 7, 2013, 16 pp.

Postel, "Internet Control Message Protocol—DARPA Internet Program Protocol Specification," RFC 792, Information Sciences Institute, Sep. 1981, 21 pp.

Saxena et al., "Detecting Data-Plane Failures in Point-to-Multipoint MPLS—Extensions to LSP Ping," RFC 6425, The IETF Trust, Nov. 2011, 28 pp.

Prosecution History from U.S. Appl. No. 13/840,657, dated Mar. 15, 2013 through Mar. 19, 2015, 91 pp.

* cited by examiner

FINDING LATENCY THROUGH A PHYSICAL NETWORK IN A VIRTUALIZED NETWORK

PRIORITY CLAIM

This application is continuation of U.S. application Ser. No. 13/840,657, filed Mar. 15, 2013, which claims the benefit of U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012, the entire content of each of which being incorporated herein by reference.

TECHNICAL FIELD

This disclosure relates to communication networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, the disclosure provides techniques for determining latency in a physical network that includes a number of network devices over which packets travel. In a virtual network architecture, information regarding latency of any particular flow, i.e., the time it takes for a packet to travel from one network device (e.g., server) to another network device via a particular path of switches and connectors, may not be readily available to the virtual network.

When a packet matching a defined set of monitored packets travels through a network device (e.g., a switch or router) during the defined time period, the network device can make a copy of the packet without affecting the flow of the packet, and send information from the copied packet back to an analytics engine of a logically centralized virtual network controller along with the time stamp and the identity of the network device. In other words, the analytics engine receives information on when and where the packet has travelled. By analyzing this information from a number of network devices, analytics engines of the virtual network controller can determine the time taken by specific packets to traverse the physical network, and can identify network devices and/or connections in the physical network that slows the speed of the network. Additionally, instead of sending back an entire copy of the monitored packet, the network device can take a hash, i.e., signature, of an invariant portion of the copied packet that uniquely identifies the packet, for instance the payload, and send the signature back to the analytic engine along with a device identifier and timestamp information. Sending the signatures instead of the entire packet can provide a more scalable mechanism by compressing the amount of information that needs to be sent and stored in the network.

Using a collection of such latency information, the virtual network controller can identify places in the physical network that are slow or where bottlenecks in traffic are occurring. Such a bottleneck may be indicative of a problem with the physical network, such as, for example, a deteriorated cable. Identifying such problems in the physical network without having to run specific testing on each of the components of the network may save time and money, and can help ensure that the network performs optimally and without interruption.

In one embodiment, a method for determining latency of a physical network path in a network includes receiving, by a virtual network controller, a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received. The method also includes identifying, by the virtual network controller, two or more of the plurality of messages having a common packet signature, and determining, by the virtual network controller, a latency of a physical network path in the network based on analysis of contents of the identified messages having a common packet signature.

In another embodiment, a method includes receiving from a virtual network controller, by a network device, information specifying packet characteristics of packets to be analyzed, receiving a packet, responsive to determining that the packet matches the specified characteristics, and by a virtual network agent executing on the network device, determining a hash of an invariant portion of the packet that uniquely identifies the packet to obtain a packet signature, and forwarding, to the virtual network controller, a message that specifies: (1) the packet signature, (2) an identifier of the network device, and (3) a timestamp indicating a time the packet was processed by the network device.

In another embodiment, a computer-readable storage medium includes instructions for causing a programmable processor to receive a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received, identify two or more of the plurality of messages having a common packet signature, and determine a latency of a physical network path in the network based on analysis of contents of the identified messages having a common packet signature.

In a further embodiment, a virtual network controller includes one or more processors, and a plurality of virtual machines executed by the processors to receive a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received. The virtual network controller also includes a plurality of analytics virtual machines, wherein the plurality of virtual machines identify two or more of the plurality of messages having a common packet signature, and determine a latency of a physical network path in the network based on analysis of contents of the identified messages having a common packet signature.

In another example, a system includes a virtual network controller that includes one or more processors, a plurality of virtual machines executed by the processors, and a plurality of network devices comprising one or more processors, wherein the plurality of network devices receive from the virtual network controller, information specifying packet characteristics of packets to be analyzed receiving a packet, wherein the plurality of virtual machines receive a plurality of messages from the plurality of network devices, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received, wherein the virtual network controller further comprises a plurality of analytics virtual machines that identify two or more of the plurality of messages having a common packet signature, and determine a latency of a physical network path in the network based on analysis of contents of the identified messages having a common packet signature, and wherein the plurality of network devices comprise a virtual network agent executing on the processors that, responsive to determining that the packet matches the specified characteristics, determining a hash of an invariant portion of the packet that uniquely identifies the packet to obtain a packet signature, and forward, to the virtual network controller, a message that specifies: (1) the packet signature, (2) an identifier of the network device, and (3) a timestamp indicating a time the packet was processed by the network device.

The details of one or more aspects of this disclosure are set forth in the accompanying drawings and the description below. Other features, objects, and advantages will be apparent from the description and drawings, and from the claims.

DETAILED DESCRIPTION

Figure 1:
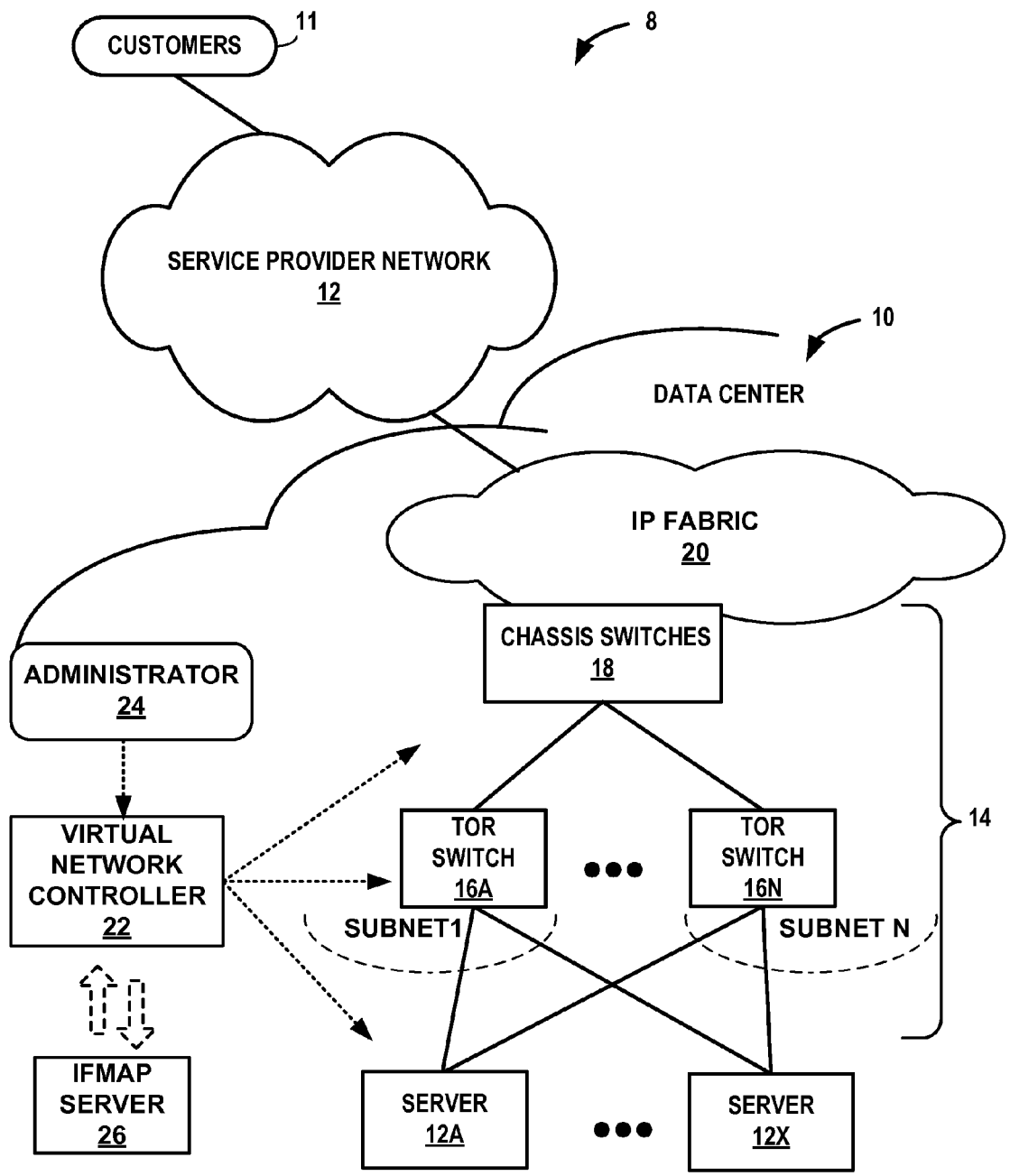
FIG. 1 is a block diagram illustrating an example data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 12. Data center 5 may, for example, host infrastructure equipment, such as networking and storage systems, redundant power supplies, and environmental controls. Service provider network 12 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 5 includes set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 12. Chassis switches 18 aggregates traffic flows and provides high-speed connectivity between TOR switches 16. TOR switches 16A and 16B may be network devices that provide layer 2 (MAC address) and/or layer 3 (IP address) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 using service provider network 12.

Virtual network controller 22 ("VNC") provides a logically centralized controller for facilitating operation of one or more virtual networks within data center 10 in accordance with one or more embodiments of this disclosure. In some examples, virtual network controller 22 may operate in response to configuration input received from network administrator 24. As described in further detail below, servers 12 may include one or more virtual switches that create and manage one or more virtual networks that are used by applications.

Typically, the traffic between any two network devices, such as between network devices within IP fabric 20 (not shown) or between servers 12 and customers 11, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header to a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Each individual switch router in the network will perform its own independent hashing computation to determine the path that will be used by a particular flow. The ECMP paths between the first and second network devices may be viewed by the virtual network as one physical connection, as their packet (inner packet) is encapsulated by the outer IP encapsulation.

In such a network, information regarding network controller 22. To find the real latency, a statistical technique may need to be employed. Typically, the virtual network domain is controlled separately from the physical network domain and, as a result, the ability to ascertain the actual path of a packet for a given network flow within the virtual network domain is not straightforward, and typically requires knowledge of the state of the physical network.

One technique that could be employed to determine the path taken by a network IP packet through a switch router network is to use an IP trace-route function, which is supported by most operating systems as well as network operating systems. However, such a trace-route function does not work well when a multi-path latency of any particular flow, i.e., the time it takes for a packet to travel from one network device (e.g., server) to another network device via a particular path of switches and connectors (e.g., within IP fabric 20), is not readily available to the virtual network and to virtual routing technique is employed, as different network flows use different paths through the network and the trace-route packet that is used to ascertain the route will not have the same header as the application packet. Because hashing functions in most network switch routers depends on the packet header, this trace-route packet may not follow the same path.

In accordance with the techniques of this disclosure, one method for determining latency in a multi-path routing environment is to collect statistics on every virtual switch node (e.g., residing on servers 12), that is, every switch node collects data on which packets have travelled through the switch node and when they travelled through the switch node between servers 12. The switch then sends this data to an analytics engine executing on virtual network controller 22. The analytics engine can use the data to calculate latency. Collecting all such data from the virtual switch nodes on all servers 12, however, may result in massive amounts of data, which may be difficult to use effectively and will eat away network bandwidth. So in some exemplary embodiments, an administrator 24 may choose to restrict the data that is gathered. For example, the administrator 24 may specify at virtual network controller 22 that statistics are to be captured for a certain class of traffic, and may also restrict the period of time over which statistic are collected. To capture a certain class of traffic the packet can be used like a match list, called a packet classifier. Virtual network controller 22 can send the packet classifiers down to be installed on the appropriate servers 12.

Figure 2:
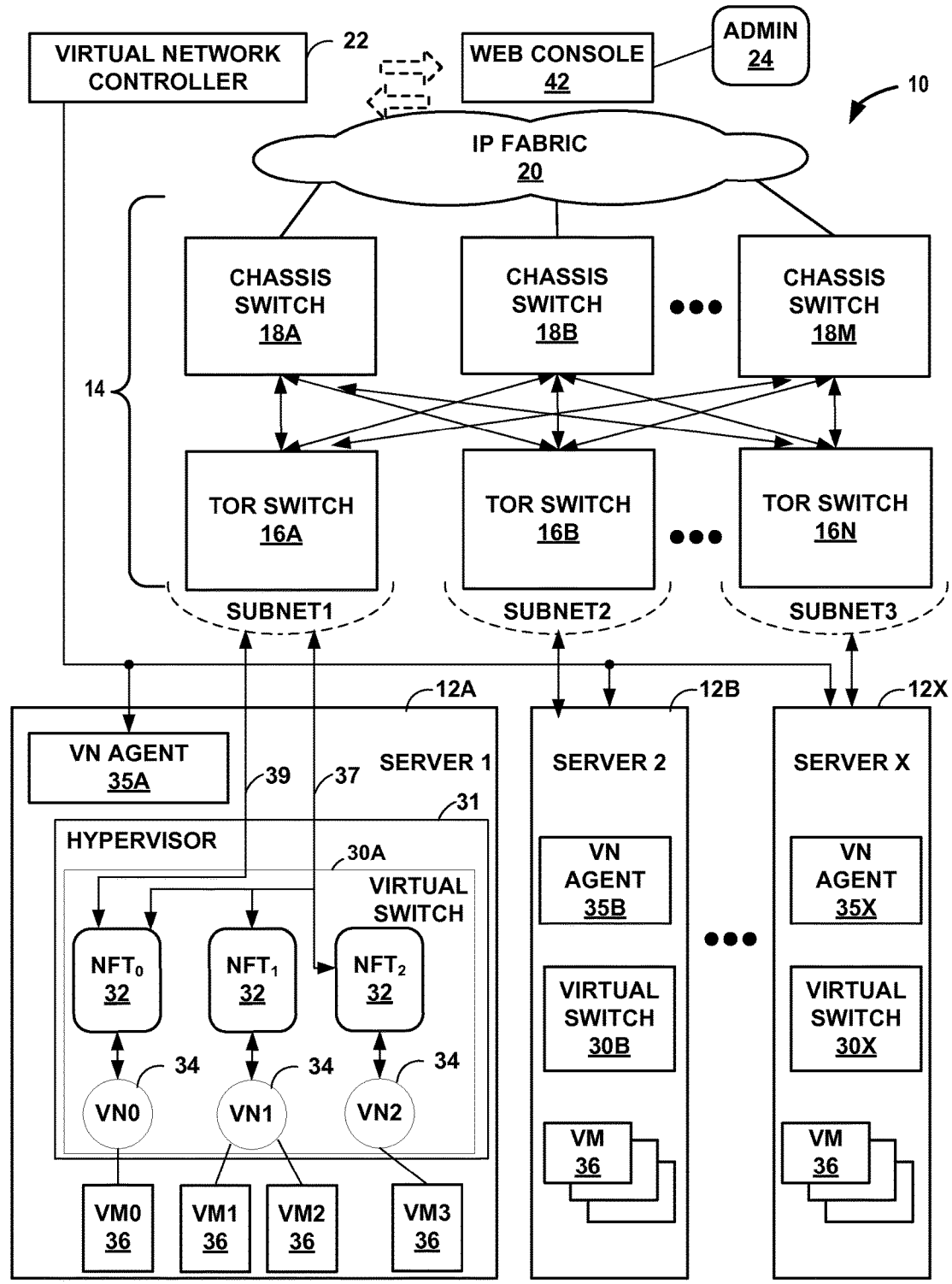
FIG. 2 is a block diagram illustrating in further detail an example system in which the techniques described herein may be implemented.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software switches 30A-30X (also referred to as a "virtual switches). Virtual switches 30 dynamically create and manage one or more virtual networks 34 to be used by applications communicating with application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network 34 may use its own addressing and security scheme and may be viewed as orthogonal from the physical network and its addressing scheme. Various techniques may be used to transport packets within and across virtual network(s) 34 over the physical network.

Each virtual switch 30 may execute within a hypervisor, a host operating system or other component of each of servers 12. In the example of FIG. 2, virtual switch 30 executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, i.e., server 12A in the example of FIG. 2.

In one implementation, each of servers 12 includes a virtual network agent ("VN agent") 35A-35X ("VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., on or more routing tables that store routing information for the physical network as well as the overlay network of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicasting replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. In some aspects, once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

In accordance with the techniques of this disclosure, administrator 24 may configure packet classifiers to specify which packets are to be monitored for latency and on which time domains on virtual network controller 22 via commands entered in web console 42. Virtual network controller 22 notifies relevant VN agents 35 of the packet monitoring definitions based on the packet classifiers. VN agents 35 install packet capture logic on respective virtual switches 30. Virtual switches 30 match packets using the packet capture logic, and sends copies of the matching packets to VN agents 35. VN agents 35 calculate a packet signature for each packet, and send information to virtual network controller 22, such as information specifying the packet signature, a switch identifier of the virtual switch 30 that matched the packets, and a timestamp indicating the time of calculating the packet signature (or a time of matching the packets, for example). Distributed analytics engines of virtual network controller 22 analyze the received information and compile results regarding packet latency, as described in further detail below. Virtual network controller 22 may send results, such as a report, to web console 42 for display to administrator 24.

Figure 3:
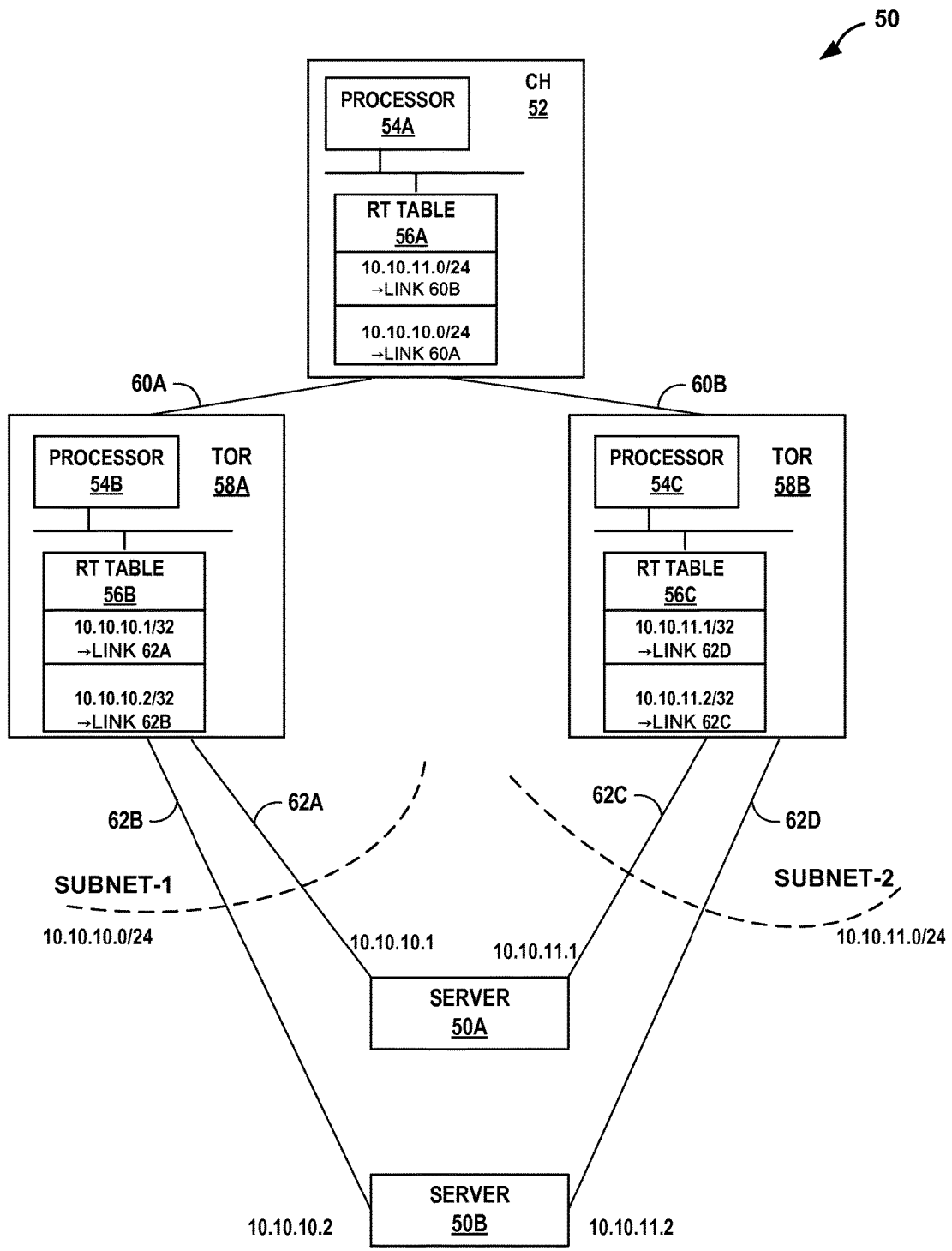
FIG. 3 is another block diagram illustrating an example system 50 illustrating example configuration of chassis switch and TOR switches as described herein.

FIG. 3 is another block diagram illustrating an example system 50 illustrating example configuration of routing information within chassis switch and TOR switches as described herein. System 50 of FIG. 3 may, for example, correspond to portions of data center 10 illustrated in FIGS. 1 and 2.

In this example, chassis switch 52 ("CH 52"), which may be any of chassis switches 18 of FIG. 1, is coupled to Top of Rack (TOR) switches 58A-58B ("TORs 58") by chassis link 60A and chassis link 60B, respectively ("chassis links 60"). TORs 58 may, in some examples, be any of TORs 16 of FIG. 1. In the example of FIG. 3, TORs 58 are also coupled to servers 50A-50B ("servers 50") by TOR links 62A-62D ("TOR links 62"). Servers 50 may be any of servers 210 (FIG. 1). Here, servers 50 communicate with both TORs 58, and can physically reside in either associated rack. TORs 58 each communicate with a number of network switches, including chassis switch 18A.

Chassis switch 18A has a processor 54A in communication with an interface for communication with a network as shown, as well as a bus that connects a memory (not shown) to processor 54A. The memory may store a number of software modules. These modules include software that controls network routing, such as an Open Shortest Path First (OSPF) module (not shown) containing instructions for operating the chassis switch 18A in compliance with the OSPF protocol. Chassis switch 18A maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component.

TORs 58 each have a respective processor 54B, 54C, an interface in communication with chassis switch 18A, and a memory (not shown). Each memory contains software modules including an OSPF module and routing table 56B, 56C as described above.

TORs 58 and chassis switch 18A may exchange routing information specifying available routes, such as by using a link-state routing protocol such as OSPF or IS-IS. TORs 58 may be configured as owners of different routing subnets. For example, TOR 58A is configured as the owner of Subnet 1, which is the subnet 10.10.10.0/24 in the example of FIG. 2, and TOR 58A is configured as the owner of Subnet 2, which is the subnet 10.10.11.0/24 in the example of FIG. 2. As owners of their respective Subnets, TORs 58 locally store the individual routes for their subnets and need not broadcast all route advertisements up to chassis switch 18A. Instead, in general TORs 58 will only advertise their subnet addresses to chassis switch 18A.

Chassis switch 18A maintains a routing table ("RT table") 56A, which includes routes expressed as subnets reachable by TORs 58, based on route advertisements received from TORs 58. In the example of FIG. 2, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 18A receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.0.0, i.e., the address of the subnet of TOR 58A, the routing table of chassis switch 18A indicates that the packet is to be sent to TOR 58A via link 60A, and chassis switch 18A transmits the packet accordingly, ultimately for forwarding to a specific one of the servers 50.

Similarly, each of TORs 58 receives Internet Protocol (IP) packets through its network interface, reads the packets' destination IP address, looks up these addresses on its routing table 56 to determine the corresponding destination component, and forwards the packets according to the result of the lookup.

Figure 4:
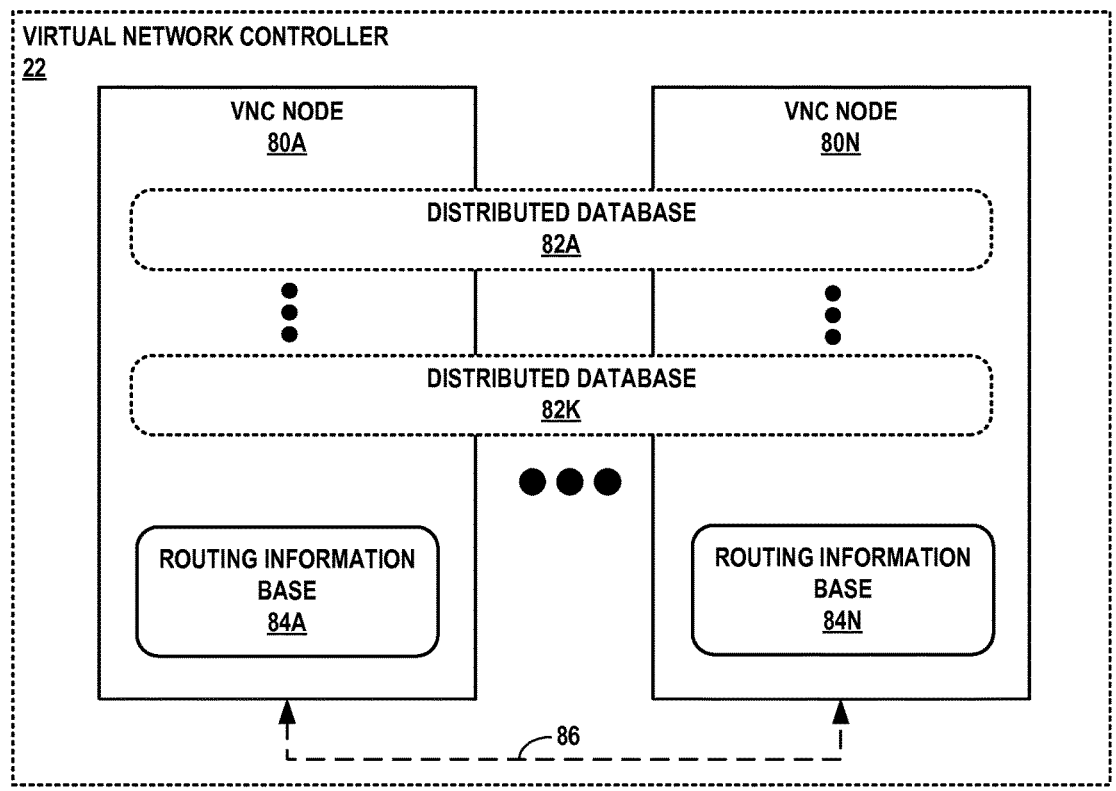
FIG. 4 is a block diagram illustrating an example implementation of a virtual network controller for facilitating operation of one or more virtual networks in accordance with one or more embodiments of this disclosure.

FIG. 4 is a block diagram illustrating an example implementation of a virtual network controller 22 for facilitating operation of one or more virtual networks in accordance with one or more embodiments of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 22.

In accordance with the techniques of this disclosure, when virtual network controller 22 notifies VN agents 35 of the servers 12 of the packet classifier information, and when VN agents 35 send packet signatures back up to virtual network controller 22, these communications may occur over peering links 66, such as via a routing protocol like BGP or other peering protocol. Analytics engines of virtual network controller 22 may analyze the signature data based on distributed databases 82, as described in further detail below.

Figure 5:
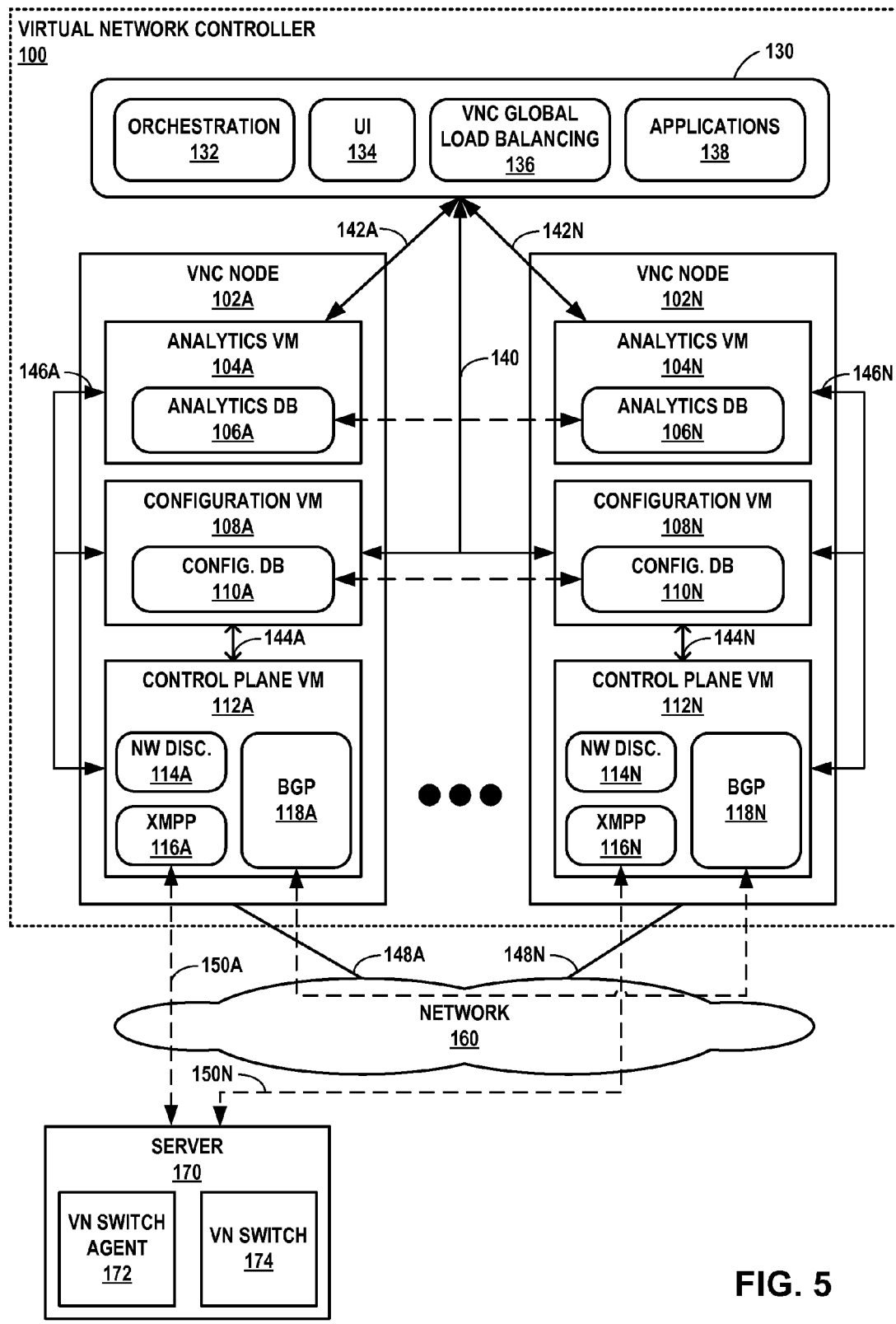
FIG. 5 is a block diagram illustrating an example implementation of a virtual network controller for facilitating operation of one or more virtual networks in accordance with one or more embodiments of this disclosure.

FIG. 5 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. For example, referring to FIG. 2, when virtual network controller 22 notifies VN agents 35 of the servers 12 of the packet classifier information, and when VN agents 35 send packet signatures back up to virtual network controller 22, these communications may occur as interactions between VNC nodes 102 by BGP 118A, for example.

Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 140, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

In accordance with the techniques of this disclosure, analytics VM 104 (which may also be referred to herein as "analytics engines") analyze the status of the physical network indicated by network 160, which may include IP fabric 20 (FIG. 1). Network 160 may include, for example, switches (routers) and connectors. Analytics VM 104 includes, for example, analytics databases 106 and memory (not shown) that may be linearly scaled via same virtual network forming the network 160. Analytics VM 104 are connected to network 160 via connectors 148A-148N. The system of FIG. 5 includes various servers including server 170, which may be servers such as described in FIG. 2 as servers 12. Server 170 includes a virtual switch 174, also sometimes referred to as a virtual network router (VN-router), which encapsulates and forwards the application packets over the physical network, and a virtual network agent, VN switch agent 172, which provides the intelligence to virtual switch 174 by talking to virtual network controller 100 and provides statistics to analytics VM 104. The virtual switch 174 hides the physical network from the physical switches and routers as found in the IP fabric of network 160. Thus, it can appear that, for example, server 12A is directly connected to server 12N (FIG. 1). Servers 12 also include a series of guest virtual machines VM 36 (FIG. 2). In some examples, analytics VM 104 are actually some instances of VMs 36.

One method for determining latency in a multi-path routing environment is to collect statistics on every virtual switch 174, that is, every virtual switch 174, collects data on which packets have travelled through the virtual switch 174 and when they travelled through the virtual switch 174 between servers 170. The virtual switch 174 then sends this data to one of the analytics VM 104. The analytics VMs 104 can use the data to calculate latency. For example, the administrator may specify that statistics are to be captured for a certain class of traffic, and may also restrict the period of time over which statistic are collected. To capture a certain class of traffic the packet can be used like a match list, called a packet classifier.

For example, to see how certain flows are doing, an example packet classifier "PC" is defined as:

```
PC = {
    Id: 4502
    Start-time: 8:00:00 12/5/2012
    End-time: 8:01:00 12/5/2012
    SEQ: {
        Protocol: 'TCP',
        SIP: 10.1.1.0/24,
        SP: any,
        DIP: 10.5.1.42/32,
        DP: 80,
        Comment: 'all web traffic to load balancer'
    },
    {
        Protocol: 'TCP',
        SIP: 10.1.1.42/32,
        SP: any,
        DIP: 10.5.1.45/32,
        DP: any,
        Comment: 'all traffic from load balancer to firewall'
    }
}
```

This will capture web traffic to load balancer and traffic from the load balancer that are sent to firewall, starting on 8 am Dec. 5, 2012 for one minute. This classifier can be set by web console 42 (FIG. 2) to analytics VM 104 which will inform all relevant VN switch agents 172.

Figure 6:
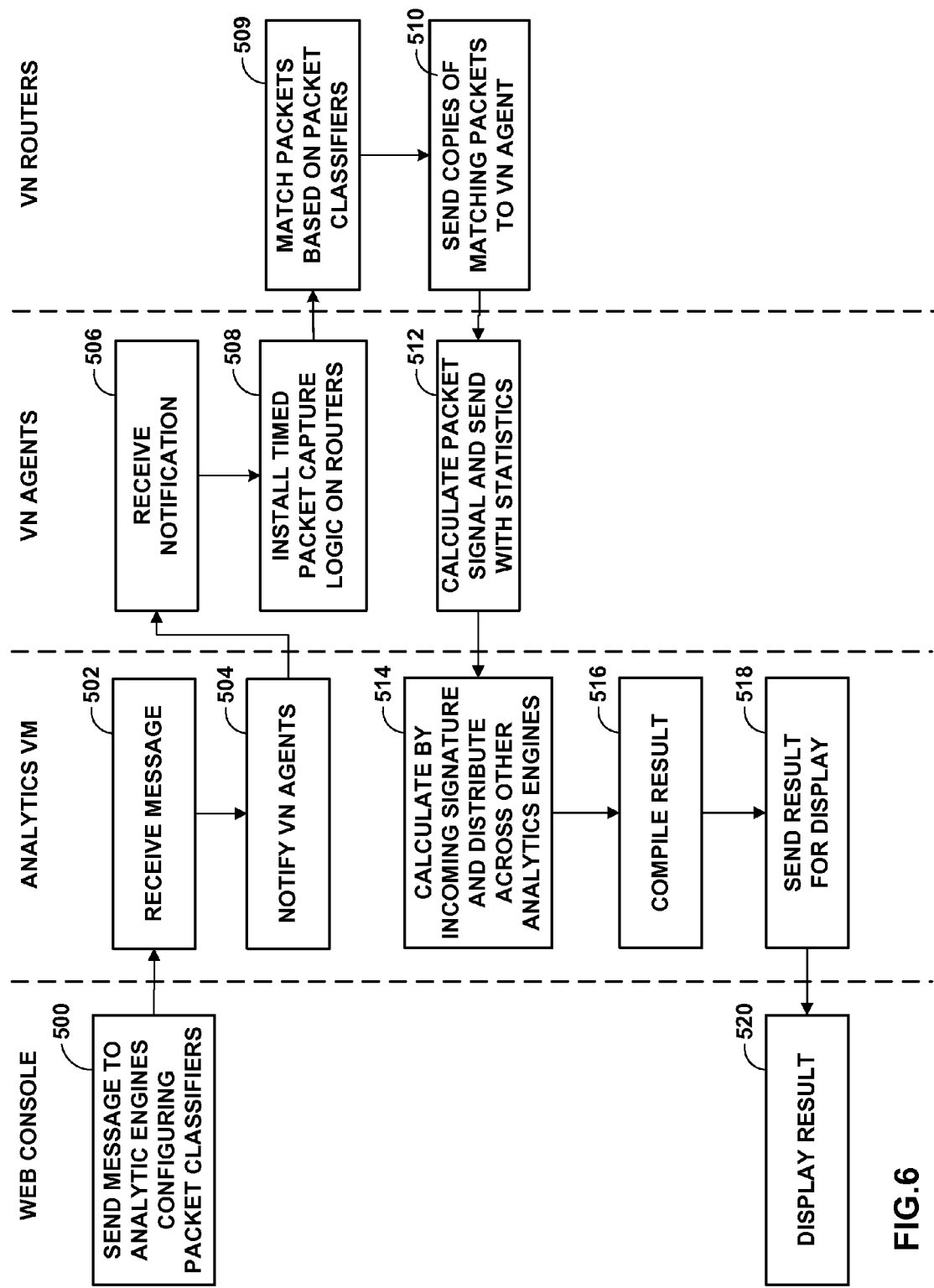
FIGS. 6-7 are flowcharts illustrating example operations of network devices in accordance with one or more embodiments of this disclosure.

FIG. 6 is a flowchart illustrating example operation of network devices in accordance with the techniques of this disclosure. FIG. 6 is described with respect to FIGS. 1-3. As shown in FIG. 6, to determine the latency of a class of traffic, a request is initiated by the admin, such as via a device used to access the network, for instance, web console 42. The request may specify a packet classifier that describes characteristics of packets to be analyzed, and may also define a time period in which the packet classifier should be applied, such as by setting a start time and end time. The web console 42 delivers a message to the analytics VM 104 with the packet classifier information (500).

The Analytics VM 104, in turn, receives the message (502) and notifies and delivers the packet classifier and time period securely to the appropriate VN switch agent 172 in the network (504). Analytics VM 104 can identify which VN switch agents 172 need to be notified based on the packet classifier, such as based on a comparison of the IP addresses in the packet classifier relative to which subnets are owned by the VN switch agent 172. Each of the notified VN switch agents 172 can install this packet classifier on their respective virtual switch 174 to capture the appropriate packets, e.g., at their egress interface. Each virtual switch 174 thus can enable the received packet classifier at the specified start time. If the end time is in the past, virtual switch 174 can ignore this packet classifier. If start time is in the past, virtual switch 174 can enable the packet classifier immediately. The virtual switch 174 will disable the packet classifier at the end time.

When a packet traveling in the network matches a packet classifier on the virtual switch 174 (509), the virtual switch 174 sends a copy of the packet to a slow path for processing at the VN switch agent 172 (510), without affecting delivery of the original received packet. In a networking data path of the switches and router, when a packet comes to be forwarded, there may exist two paths, fast path and slow path. Fast path is like cached memory, and determines what to do with the packet, such as where to send it to, without delay. If the information is not at hand, for example like cache miss, the packet is queued for further processing, where some other program looks up database to what to do with this packet, and if necessary, update the fast path cache.

Usually a network device performs this flow-based forwarding by caching or otherwise storing flow state for the packet flows of a given communication session between two devices. Generally, upon recognizing a first packet of a new flow, a network device initializes data to record the state data for the session. The VN switch agent 172 may inspect packet flows for the sessions. In some cases, the VN switch agent 172 may comprise two forwarding paths, a first path for processing a first packet of a newly established flow and a second path for inspecting and forwarding subsequent packets associated with a pre-existing flow. The first path through the VN switch agent 172 may be referred to as the "first path," "slow path," or "session management path." At this time, after processing the first packet of the newly established flow, the VN switch agent 172 may update flow tables to record the session and otherwise initialize session data. The second path through VN switch agent 172 may be referred to as the "fast path" because the second path normally does not take as long to traverse as the first path due to the lack of detailed inspection needed for subsequent packets in an already-established flow. Further details relating to network devices having a fast path and slow path can be found in U.S. Pat. No. 8,339,959, filed Jul. 30, 2008, entitled "Streamlined Packet Forwarding using Dynamic Filters for Routing and Security in a Shared Forwarding Plane," the entire content of which is incorporated by reference herein. Virtual switch 174 sends additional information such as a timestamp, ingress port and egress port etc. to the slow path along with the copy of the packet.

As will be described in more detail below with respect to FIG. 7 the VN switch agent 172 calculates the packet signature and sends that with statistics to analytics VM 104 (512), analytics VM 104 calculates by incoming signature and may distribute the calculation across other Analytics VM 104 in virtual network controller 100 (514), and analytics VMs 104 compiles the result (516) and may optionally send the compiled result to the web console 42 for display and/or further use (518). The web console may display the result (520).

Figure 7:
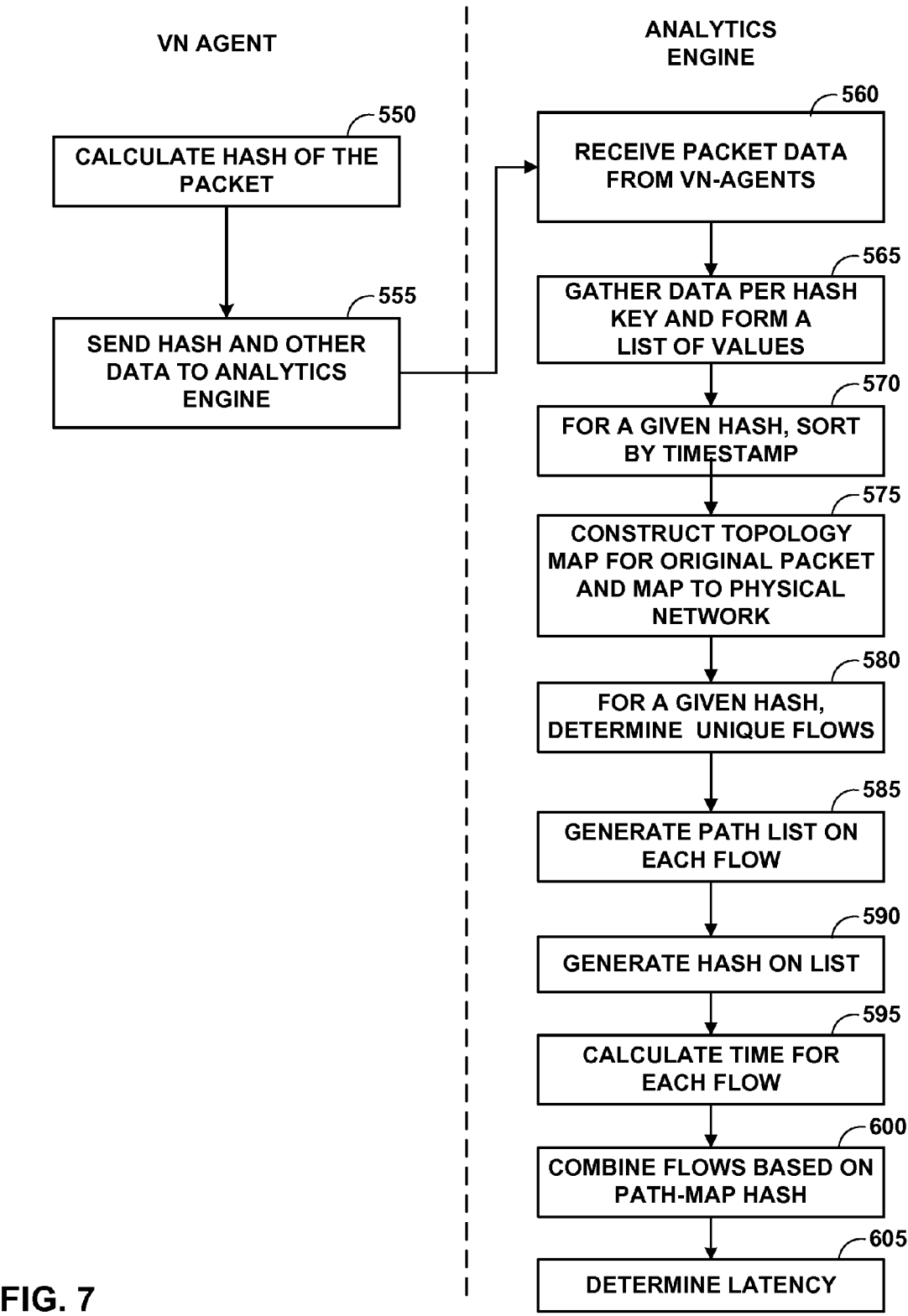

FIG. 7 is a flowchart illustrating example operation of network devices in accordance with the techniques of this disclosure. FIG. 7 illustrates one example operation of how latency may be calculated by a virtual network controller, but the techniques of this disclosure are not limited to this particular example. As shown in FIG. 7, VN switch agent 172, on receiving one such packet, first calculates a hash (550) (such as md5, sha1, etc.) of a part of packet that is path invariant and uniquely identifies the packet (such as, for example, the IP payload). This hash will be treated as the key, or signature, of the packet. This key along with the switch identifier, which is unique to the VN switch agent 172, and which identifies which virtual switch 174 the packet passed through, timestamp, ingress port, egress port, etc. as data will be sent back to the analytics VM 104 for further processing (555). Analytics VM 104 also receives this data from VN agents 172 of other servers 170 (not shown in FIG. 5) (560).

On the expiry of the end time (plus some jitter), analytics VMs 104 will start processing each packet by the hash keys. Such initial processing may include gathering data per key, and forming a list of values of the key and assigning a job per key (packet hash) to one of the analytics VMs 104 across virtual network controller 100 (565). That is, each original packet yielded a unique hash, which can be used as the key to identify each of the packets and their information. Analytics VM 104 may obtain, for each hash, a list of switch ids, timestamps, ingress ports and egress ports, etc.

For each hash, analytics VM 104 will then sort the associated list by timestamp (570) and construct the topology map that the packet has traversed (virtual network topology map) based on the list of switch ids and timestamps, and match the topology map up with the known physical topology of the network (575). The virtual network topology map includes a topology map of virtual switches based on the virtual switch ids. As analytics VMs 104 are linearly scaled, each gets a part of the job to process and determine the results. Near consistency of the timestamp is assumed to allow the clock drifts.

Next, the analytic engine 320 identifies the source and destination of this packet represented by the hash, and this hash can be broken down as n-distinct flows (580). Then, on each of the flows, analytics VM 104 generates the path list (590), which consists of {switch-1, switch-2 . . . switch-r}, which are the specific physical switches that the packet traversed. Analytics VM 104 generates a hash on this switch list or path-map (595), which is used as the key for the subsequent calculation. For each path-map hash, the near consistent time that the packet took from its source to its destination can be determined. The expected error is also calculated, which will be used to calculate the jitter or latency per path.

With the path-map hash, all the flows can be combined (600) detected for a path-map and from there analytics VM 104 can compute the statistical measure of the latency (605). By combining across the packet classifier, analytics VMs 104 can determine the real latency by evaluating minimum, maximum, mean and standard deviation per path in this network.

Using a collection of such latency information, virtual network controller 100 can identify places in the physical network that are slow or where bottlenecks in traffic are occurring. Such a bottleneck may be indicative of a problem with the physical network, such as, for example, a deteriorated cable. Identifying such problems in the physical network without having to run specific testing on each of the components of the network saves time and money, and can help ensure that the network performs optimally and without interruption.

Additionally, the method can be used with any sets of physical switches provided that for each physical switch in the set there is an associated VN-agent capable of receiving the PC, identifying (and hashing) the identified packets, and forwarding it to an analytics engine for further processing as described above.

Various embodiments are described herein, including methods and techniques. Techniques of this disclosure may also be used in an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 8:
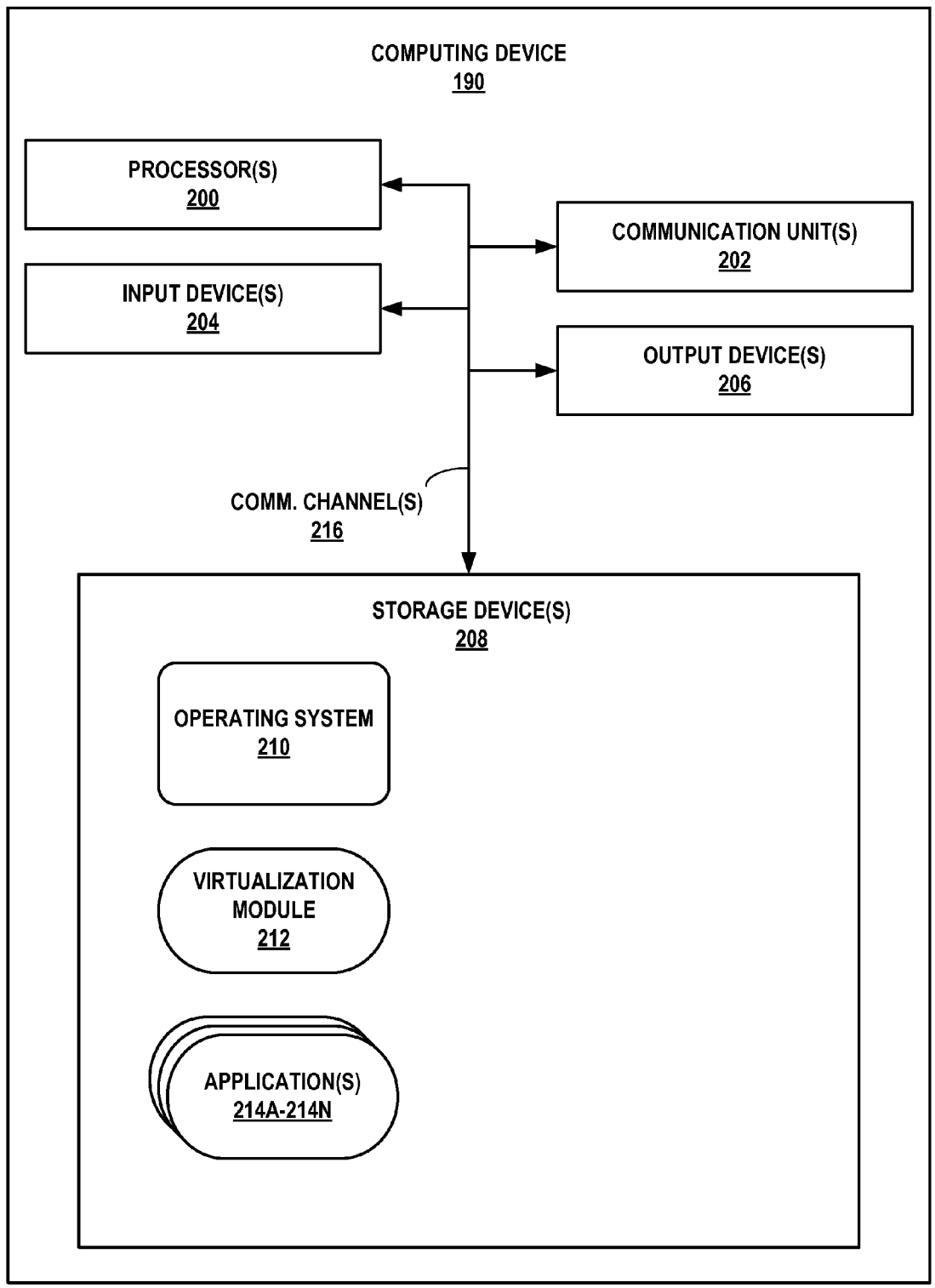
FIG. 8 is a block diagram illustrating an example device in accordance with one or more aspects of the present disclosure.

FIG. 8 is a block diagram illustrating an example device 190 for computing latency in a physical network, in accordance with one or more aspects of the present disclosure. FIG. 8 illustrates only one particular example of computing device 190, and many other examples of computing device 190 may be used in other instances. Computing device 190 may represent, for example, any of servers 12, TOR switches 16, chassis switches 18, virtual network controller 22, web console 42, or IFMAP server 26 of FIGS. 1-2, for example.

As shown in the specific example of FIG. 8, computing device 190 includes one or more processors 200, one or more communication units 202, one or more input devices 204, one or more output devices 206, and one or more storage devices 208. Computing device 190, in the specific example of FIG. 8, further includes operating system 210, virtualization module 212, and one or more applications 214A-214N (collectively "applications 214"). Each of components 200, 202, 204, 206, and 208 may be interconnected (physically, communicatively, and/or operatively) for inter-component communications. As one example in FIG. 8, components 200, 202, 204, 206, and 208 may be coupled by one or more communication channels 216. In some examples, communication channels 216 may include a system bus, network connection, interprocess communication data structure, or any other channel for communicating data. Virtualization module 212 and applications 214, as well as operating system 210 may also communicate information with one another as well as with other components in computing device 190. Virtualization may allow the functions of these components to be distributed over multiple machines or multiple virtual machines, while a hypervisor gives the appearance of single component.

Processors 200, in one example, are configured to implement functionality and/or process instructions for execution within computing device 190. For example, processors 200 may be capable of processing instructions stored in storage devices 208. Examples of processors 200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 190 during operation. Storage devices 208, in some examples, are described as a computer-readable storage medium. In some examples, storage devices 208 are a temporary memory, meaning that a primary purpose of storage devices 208 is not long-term storage. Storage devices 208, in some examples, are described as a volatile memory, meaning that storage devices 208 do not maintain stored contents when the computer is turned off. Examples of volatile memories include random access memories (RAM), dynamic random access memories (DRAM), static random access memories (SRAM), and other forms of volatile memories known in the art. In some examples, storage devices 208 are used to store program instructions for execution by processors 200. Storage devices 208, in one example, are used by software or applications running on computing device 190 (e.g., operating system 210, virtualization module 212 and the like) to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 190, in some examples, also includes one or more communication units 202. Computing device 190, in one example, utilizes communication units 202 to communicate with external devices. Communication units 202 may communicate, in some examples, by sending data packets over one or more networks, such as one or more wireless networks, via inbound and outbound links. Communication units 202 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components. In some examples, computing device 190 utilizes communication units 202 to communicate with other network devices, such as to send or receive packet signatures as described herein.

Computing device 190, in one example, also includes one or more input devices 204. Input devices 204, in some examples, are configured to receive input from a user through tactile, audio, or video feedback. Examples of input devices 204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 206 may also be included in computing device 190. Output devices 206, in some examples, are configured to provide output to a user using tactile, audio, or video stimuli. Output devices 206, in one example, include a presence-sensitive display, a sound card, a video graphics adapter card, or any other type of device for converting a signal into an appropriate form understandable to humans or machines. Additional examples of output devices 206 include a speaker, a cathode ray tube (CRT) monitor, a liquid crystal display (LCD), or any other type of device that can generate intelligible output to a user.

Computing device 190 may include operating system 212. Operating system 212, in some examples, controls the operation of components of computing device 190. For example, operating system 212, in one example, facilitates the communication of modules applications 214 with processors 200, communication units 202, input devices 204, output devices 206, and storage devices 210. Applications 214 may each include program instructions and/or data that are executable by computing device 190. As one example, application 214A may include instructions that cause computing device 190 to perform one or more of the operations and actions described in the present disclosure.

In accordance with techniques of the present disclosure, computing device 190 may operate in accordance with the example processes described in FIGS. 6-7.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
receiving, from a virtual network controller, by a network device having a virtual network agent and a virtual network switch of a plurality of interconnected virtual network switches connected to the virtual network controller by an overlay network, information specifying packet characteristics of packets to be analyzed and a time period during which to apply the packet characteristics;
in response determining that a time the information is received is later than the time period during which to apply the packet characteristics, ignoring, by the virtual network agent, the received information; and
in response to determining that the time period during which to apply the packet characteristics has not passed:
  installing, by the virtual network agent and based on the information, a packet classifier to the virtual network switch;
  responsive to determining that a received packet matches the specified characteristics, by the virtual network agent, determining a hash of an invariant portion of the packet that uniquely identifies the packet to obtain a packet signature; and
  forwarding, to the virtual network controller, a message that specifies: (1) the packet signature, (2) an identifier of the network device, and (3) a timestamp indicating a time the packet was processed by the network device.

2. The method of claim 1, wherein the identifier of the network device comprises an identifier of the virtual network switch.

3. The method of claim 1, wherein the invariant portion of the packet comprises a payload of the packet.

4. The method of claim 1, wherein the received information specifies the time period during which to apply the packet characteristics by specifying a start time and an end time.

5. The method of claim 1, further comprising disabling the installed packet classifier at the specified end time.

6. The method of claim 1, wherein the packet characteristics comprise a source address and destination address of the packets to be analyzed.

7. A network device comprising:
a virtual network agent configured to receive, from a virtual network controller, information specifying packet characteristics of packets to be analyzed and a time period during which to apply the packet characteristics;
a virtual network switch of a plurality of interconnected virtual network switches connected to the virtual network controller by an overlay network,
wherein the virtual network agent is configured to, in response to determining that a time the information is received is later than the time period during which to apply the packet characteristics, ignore the received information, and
wherein the virtual network agent is configured to, in response to determining that the time period during which to apply the packet characteristics has not passed:
  install, to the virtual network switch, a packet classifier based on the information specifying packet characteristics of packets to be analyzed and the time period;
  responsive to determining that a received packet matches the specified characteristics, determine a hash of an invariant portion of the packet that uniquely identifies the packet to obtain a packet signature; and
  forward, to the virtual network controller, a message that specifies: (1) the packet signature, (2) an identifier of the network device, and (3) a timestamp indicating a time the packet was processed by the network device.

8. The network device of claim 7, wherein the identifier of the network device comprises an identifier of the virtual network switch.

9. The network device of claim 7, wherein the invariant portion of the packet comprises a payload of the packet.

10. The network device of claim 7, wherein the received information specifies the time period during which to apply the packet characteristics by specifying a start time and an end time.

11. The network device of claim 7, wherein the virtual network agent is configured to disable the installed packet classifier at the specified end time.

12. The network device of claim 7, wherein the packet characteristics comprise a source address and destination address of the packets to be analyzed.

13. A non-transitory computer-readable medium storing instructions that when executed cause one or more processors of a network device to:
receive, from a virtual network controller, information specifying packet characteristics of packets to be analyzed and a time period during which to apply the packet characteristics;
in response to determining that a time the information is received is later than the time period during which to apply the packet characteristics, ignore the received information; and
in response to determining that the time period during which to apply the packet characteristics has not passed:
  install a packet classifier on the network device based on the information specifying packet characteristics of packets to be analyzed and the time period;
  responsive to determining that a received packet matches the specified characteristics, and by the virtual network agent, determining a hash of an invariant portion of the packet that uniquely identifies the packet to obtain a packet signature; and
  forwarding, to the virtual network controller, a message that specifies: (1) the packet signature, (2) an identifier of the network device, and (3) a timestamp indicating a time the packet was processed by the network device.

* * * * *